United States Patent Office 3,842,037
Patented Oct. 15, 1974

3,842,037
PROCESS FOR PREPARING HIGHER MOLECULAR WEIGHT POLYEPOXIDE PRODUCTS BY CONDENSING LOWER MOLECULAR WEIGHT POLYEPOXIDE WITH POLYHYDRIC PHENOLS
Feije H. Sinnema, Amsterdam, Netherlands, assignor to Shell Oil Company, New York, N.Y.
No Drawing. Filed May 31, 1973, Ser. No. 365,675
Claims priority, application Netherlands, June 8, 1972, 7226794
Int. Cl. C08g 30/04
U.S. Cl. 260—47 EP
8 Claims

ABSTRACT OF THE DISCLOSURE

An improved process for preparing higher molecular weight polyepoxide compounds from lower molecular weight polyepoxides by condensing said lower molecular weight polyepoxides (i.e., below about 3500) with a polyhydric phenol in the presence of an alkaline condensation catalyst such as NaOH is described. Essentially, the improvement comprises adding a small amount of a strong, inorganic acid at the end of the fusion-reaction.

BACKGROUND OF THE INVENTION

Field of the Invention

This invention relates to an improved process for the preparation of a polyepoxide product by condensing a polyhydric phenol at a temperature of 140–200° C. with a polyepoxide starting material having a lower molecular weight than the polyepoxide product, which is below 3500, in particular below 2000.

Prior Art

It has already been proposed to prepare polyepoxides of high molecular weight by a two-step process wherein in the first step, an initial, lower-molecular-weight polyepoxide is produced by the reaction of a polyhydric phenol and epichlorohydrin in the presence of an alkaline compound in a sufficient amount to combine with the chlorine of the chlorohydrin, followed by removal of the byproduct salt and any excess alkali with addition in the second step of a polyhydric phenol to the initial polyepoxide and heating the resulting mixture to effect fusion and reaction of the polyhydric phenol with the initial polyepoxide to form polyepoxides with a higher melting point and higher molecular weight. As a matter of fact, the said two steps may be carried out independently of each other.

Various catalysts have been proposed and are being used in this fusion-reaction step, such as inorganic bases, tertiary amines, quaternary ammonium bases, phosphines and quaternary phosphonium salts. The use of phosphoric acid as a catalyst in the cure of diglycidyl ethers with diphenols to thermosetting resins has been described in U.S. Patent specification 2,506,486.

The use of tetraalkylammonium halides as catalysts is described and claimed in applicant's copending application Ser. No. 324,698, filed Jan. 18, 1973.

The higher-molecular-weight polyepoxides so prepared are obtained in the form of a viscous liquid that has to be cooled. A known procedure for cooling and solidifying the products obtained comprises supplying the resinous materials in the liquid state to a moving endless belt and gradually cooling the layer of resinous material on the belt. According to another method the resin is cooled in open pans.

The dumping of polyepoxide products, in particular higher-molecular-weight polyepoxides on the belt should, however, be effected carefully and slowly so as to prevent clotting or lumping of the resin, i.e., the resin should be allowed to spread evenly. Owing to the high viscosity of the higher-molecular-weight polyepoxides the dumping will in general proceed too slowly, causing the resin which has not yet been dumped to react further. Also, the dumping speed may be limited by the cooling capacity of the belt. As a result, the resinous product may be left undesirably long in the reactor.

These factors adversely affect the properties of the polyepoxide product in that both the molecular weight and the viscosity will increase to undesired levels. Moreover, as a result of the long dumping times, large reactors cannot be employed to their full capacity.

A method for reducing the viscosity of the polyepoxide product, thereby permitting quicker dumping of the product on the belt or in the pan has been claimed in applicant's copending application Ser. No. 238,529, filed Mar. 27, 1972 now abandoned, describing a method for the manufacture of the polyepoxide product in the presence of a small quantity of a special inert solvent, for example, diethylene glycol monomethyl ether or ethylene glycol monoethyl ether acetate.

Although the presence of inert solvents is advantageous in that a quicker dumping of the resin on the cooling means is permitted which will reduce the continued reaction of the polyepoxide product during unloading while a larger part of the kettle capacity may be used, the viscosity of the reaction product still increases during the dumping time, albeit less markedly than in the absence of an inert solvent. Therefore, it is highly desirable to develop a process in which the epoxy equivalent weight and viscosity of the reaction product does not increase during the unloading, or does so only marginally while simultaneously the molecular weight of the polyepoxide product can be maintained at the desired level.

It has now been found that the addition of a small amount of strong, inorganic acid at the end of the fusion-reaction results in no further or only a marginal increase in viscosity and epoxy equivalent weight. As a consequence, these essential product properties remain substantially constant during subsequent dumping, i.e., the dumping time is not a critical factor any more. For example, in a 3 hours dumping operation the epoxy equivalent weight (WPE) could rise from 2400 to 3000; when a small amount of phosphoric acid was added at the end of the fusion-reaction, the WPE increased to only 2550 under otherwise similar conditions. As another desirable result, large reactors may be used to full capacity.

SUMMARY OF THE INVENTION

Accordingly, the invention can be described as relating to a process for the preparation of polyepoxides by condensing a polyhydric phenol in the presence of a small amount of a base, as a condensation catalyst, at a temperature of between 140 and 200° C., with a polyepoxide starting material having a lower molecular weight than the polyepoxide product which is below 3500, in particular below 2000, which process comprises adding a small amount of a strong, inorganic acid when at least 85%, in particular at least 95%, of the phenolic hydroxyl groups present in the starting materials have been converted.

DESCRIPTION OF THE PREFERRED EMBODIMENTS

Reactions between the epoxy groups of the starting material or product with the hydroxyl group of a hydroxyl-group-containing solvent, if present are also prevented by the neutralization of the alkaline catalyst.

Suitable strong inorganic acids include any inorganic acid having a pKa-value below 4, such as hydrohalic acids, e.g., hydrogen chloride, provided the reaction is carried out in suitable equipment, sulfuric acid and phosphoric acids, such as ortho-phosphoric acid, metaphosphoric acid, pyrophosphoric acid, phosphorus acids and even phosphorus pentoxide, provided a sufficient amount of water is present in the reaction mixture. The use of phosphoric acids, especially ortho-phosphoric acids, is preferred.

Weak organic acids proved to be unsuitable for the process according to the invention because of the occurrence of side reactions.

The amount of inorganic acid to be added can be very small as the acid serves to destroy the alkaline condensation catalyst, which catalyst will be generally utilized in an amount in the range of from 0.01 to 0.5 meq./100 g. of the polyepoxide starting material. Thus an equimolar amount of inorganic acid will, in general, be sufficient for the desired purpose. Even the addition of slightly smaller amounts of acid has proved to be favorable.

o-Phosphoric acid may be used in an amount of up to 2 moles per mole of condensation catalyst. Larger amounts of acid are not precluded but do not really contribute to improve the quality of the polyepoxide product.

The acid can be added to the reaction mixture in any suitable manner, for instance, by merely introducing it on top of the stirred reaction mixture, or by injection techniques.

It is preferred, however, to introduce the acid in a small amount of the solvent already applied, during the reaction, which facilitates the mixing, thereby quickly destroying the alkaline condensation catalyst.

The term polyepoxide as used herein indicates a compound having on the average more than one epoxide group

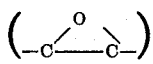

per molecule. The polyepoxide starting materials may be saturated or unsaturated, aliphatic, cycloaliphatic, aromatic or heterocyclic and may, if desired, contain non-interferring substituents, such as halogen atoms, hydroxyl groups, ether groups and ester groups.

Very suitable polyepoxide starting materials are glycidyl polyethers of polyhydric phenols (such as Novolac resins) and in particular of dihydric phenols, such as 1,1-bis(4-hydroxyphenyl)ethane, bis(4 - hydroxyphenyl)methane, bis(4-hydroxyphenyl)sulfone and the preferred 2,2-bis(4-hydroxyphenyl)propane.

The term "lower molecular weight" in relation to the polyepoxide starting materials is used herein to mean polyepoxides having a molecular weight below 3500. Polyepoxides having a molecular weight in the range of approximately 350 to approximately 1750 are preferred. The polyepoxide products have a higher molecular weight than the polyepoxides used as starting material. Thus, if the polyepoxide starting material has a molecular weight of 750 the product must have a molecular weight above 750. The product will also have a higher melting point than the polyepoxide starting material has. Depending on the ratio of the polyhydric phenol to the lower-molecular-weight polyepoxide employed, polyepoxides with molecular weights of from about 500 to 5000 (epoxy content of 0.3–4 epoxide equivalents per kg.) may be readily obtained.

The polyhydric phenols used in the process of the invention are those compounds which possess at least two OH-groups attached to an aromatic nucleus. The phenols may contain a great variety of substituents of different types. Preferred polyhydric phenols are bisphenols, in particular 2,2-bis(4-hydroxyphenyl)propane or diphenylolpropane, often abbreviated "DPP" or "bisphenol A (BPA)." In DPP the hydroxy groups may be in the para- and/or ortho-position. Bisphenols are compounds in which two phenylol groups are bound together, either directly or via an intermediate group, such as a methylene group.

Careful control of the ratio of the phenol to the polyepoxide starting material is of great importance in order to obtain a product having the desired characteristics. When technical grades of one or several reagents are employed, the correct ratio is determined on the basis of the epoxy equivalence and the phenolic hydroxyl equivalence of the reagents. Reaction mixtures should contain not less than 1.05 and not more than 10 epoxide groups per phenolic hydroxyl group. When starting from a polyepoxide having a molecular weight between 350 and 500, epoxy-to-phenolic hydroxyl ratios in the range from 1.15:1 to 2.8:1 are suitably employed.

In a preferred embodiment of the process according to the invention, the reaction is carried out in the presence of a small quantity of an inert organic oxygenated or halogenated solvent having a boiling point above 140° C., for instance 1–15% w. (based on polyepoxide starting material) of ethylene glycol monomethyl ether acetate.

Suitable inert solvents are described in copending application Ser. No. 238,529, filed Mar. 27, 1972, and so much of said application relevant to suitable inert solvents is incorporated herein by reference.

Examples of suitable solvents which can be used in the process of the invention are, for example, tetrachloroethane, cyclohexanone, acetophenone, ethylene glycol monomethyl ether acetate, 3,5,5-trimethylcyclohexene-2-one-1, ethylene glycol monoethyl ether acetate, diethylene glycol diethyl ether and diethylene glycol monomethyl ether. The last two are preferred solvents for the present condensation reaction.

The amount of solvent which can be suitably applied in the process according to the invention may be up to about 15% w. based on total amount of starting material, in particular, not more than 11% w. Preferred amounts are from 7.5 to 10%, for resin products having a WPE of more than 2000. When the amount of solvent exceeds 15% w., based on the weight of the total amount of starting material, the melting point of the polyepoxide product is not high enough, as a consequence of which the solidified resin easily clots or sticks to the cooling means.

The temperature at which the condensation reaction is carried out may be varied, but should be high enough to keep the reactants in the liquid state. The temperature should range between about 140 and 200° C., preferably between 175 and 195° C. The higher-molecular-weight polyepoxides obtained by the novel process herein described are especially useful, for instance, in the manufacture of surface coatings.

The process according to the invention is illustrated with the aid of the following examples, which should by no means be regarded as limiting the scope of the present invention.

In all experiments described hereinafter the starting polyepoxide material was a polyglycidyl ether derived from 2,2-bis(4-hydroxyphenyl)propane and epichlorohydrin, which will be referred to as "resin 1004," and having an average epoxide equivalent weight (WPE) of 862.

EXAMPLE I

A number of experiments were carried out in the following way: 412.5 g. of resin 1004 containing 0.08 meq./100 g. of alkali ($Na_2CO_3$) as a catalyst and 33.0 g. of diethylene glycol monomethyl ether were heated in a stirred glass reactor under a nitrogen blanket. When a temperature of 160° C. had been reached, 31.0 g. of diphenylolpropane (DPP) were added to the molten mass whereafter the temperature was gradually raised to 185° C. over a period of 15 minutes. The reaction mixture originating from DPP and resin 1004, which had been applied in a phenolic OH/epoxy equivalent ratio of 1:1.75, was maintained at 185° C. for 4 hours. Certain amounts of $H_3PO_4$ in 11.1 g. of diethylene glycol monomethyl ether were added to the reaction mixture 80 minutes after the temperature of 185° C. had been reached. In the comparative experiment A only 11.1 g. of the diethylene glycol monomethyl ether were added. The reaction mixture thus contained 10% w. of this solvent in each experiment. A sample was withdrawn from the reaction mixture at regular intervals in order to determine the epoxy equivalent weight (WPE), the viscosity (expressed in Poises at 25° C., measured in a 40% w. solution in butyldioxitol), and the phenolic-hydroxyl content (meq./100 g.).

The results are given in the Table.

| Experiment | $H_3PO_4$ added mmol/ 100 g. | WPE after[1]— | | | | | Viscosity after— | | | Phenolic OH after— | | | |
|---|---|---|---|---|---|---|---|---|---|---|---|---|---|
| | | 1 hour | 1½ hours | 2 hours | 3 hours | 4 hours | 1 hour | 2 hours | 4 hours | 1½ hours | 2 hours | 3 hours | 4 hours |
| A[2] | 0 | 2,516 | 2,724 | 3,056 | 3,330 | ±3,650 | 19.7 | 25.7 | ±40 | 6.4 | 3.2 | 2.8 | |
| B | 0.03 | 2,544 | [3]2,805 | 2,904 | 3,023 | 3,178 | 21.5 | 26.1 | 32.3 | [3]4.3 | 3.7 | 2.7 | 2.7 |
| C | 0.06 | 2,272 | [3]2,547 | 2,591 | 2,650 | 2,735 | 14.5 | 17.2 | 19.6 | [3]13.0 | | 9.1 | 6.2 |
| D | 0.12 | 2,409 | [3]2,614 | 2,715 | 2,768 | 2,823 | 15.1 | 17.5 | 19.9 | [3]6.5 | | | <1 |

[1] Calculated after correction for solvent.
[2] For comparison only.
[3] Analyzed before addition of $H_3PO_4$.

The experimental data clearly demonstrate that addition of $H_3PO_4$ not only ensures that the WPE can be kept constant during the required dumping time but also that the viscosity can be kept on a low level thereby permitting a quicker dumping.

EXAMPLE II

Experiment B was repeated, but instead of $H_3PO_4$ 0.08 mmol sulfuric acid was added after 80 minutes. The experimental data indicates that $H_3PO_4$ gives better results than $H_2SO_4$.

EXAMPLE III

A large-scale experiment was carried out in which 90 kg. of resin 1004, containing 0.08 meq./100 g. of alkali, and 7.5 kg. of diethylene glycol monomethyl ether were heated with stirring in a conventional reactor to a temperature of 160° C. At that temperature 7 kg. of DPP were added. The temperature was gradually raised to 185° C. whereafter the reaction mixture was kept with stirring at that temperature for another 1½ hours. The WPE of the reaction mixture proved to be 2660 and the phenolic hydroxyl content 5.4 meq./100 g. Then, a mixture of 8 g. $H_3PO_4$ in 2.5 kg. of the above solvent was added to and thoroughly mixed with the reaction mixture. A sample of the reaction mixture taken three hours after the addition of the phosphoric acid indicated a WPE of 2860, showing that by the addition of phosphoric acid the product composition can be kept more or less constant.

I claim as my invention:

1. In a process for preparing higher molecular weight resinous polyepoxides by condensing a lower molecular weight polyepoxide having more than one vicinal epoxy group with a polyhydric phenol in the presence of an alkaline condensation catalyst wherein the ratio of epoxide groups to phenolic hydroxyl groups is from about 1.05 to about 10, the improvement which comprises adding an inorganic acid having a pKa below about 4 in amount to neutralize said catalyst when at least 85% of the phenolic hydroxyl groups present in the starting materials have been converted.

2. The process of claim 1 wherein the acid is a hydrohalic acid.

3. The process of claim 1 wherein the acid is a phosphoric acid.

4. The process of claim 3 wherein the phosphoric acid is orthophosphoric acid.

5. The process of claim 1 wherein an oxygenated or halogenated inert organic solvent boiling above about 140° C. is employed.

6. The process of claim 5 wherein the inert organic solvent is diethylene glycol monomethyl ether or diethylene glycol monomethyl ether.

7. The process of claim 1 wherein the lower molecular weight polyepoxide is a glycidyl polyether of 2,2-bis(4-hydroxyphenyl)propane having a molecular weight below about 3500.

8. The process of claim 7 wherein the polyepoxide has a molecular weight between 350 and 500, the polyhydric phenol is diphenylolpropane, and the epoxy-to-phenolic hydroxyl ratio is from 1.15:1 to 2.8:1.

References Cited

UNITED STATES PATENTS 3,379,684   4/1968   Wiesner et al. _____ 260—47
2,592,560   4/1952   Greenlee _____ 260—47

WILLIAM H. SHORT, Primary Examiner
T. E. PERTILLA, Assistant Examiner

U.S. Cl. X.R.
260—348 R